Patented July 13, 1926.

1,592,543

UNITED STATES PATENT OFFICE.

JAMES K. STEWART, OF BERKELEY, CALIFORNIA, ASSIGNOR TO SHELL COMPANY OF CALIFORNIA, OF SAN FRANCISCO, CALIFORNIA, A CORPORATION OF CALIFORNIA.

DECOLORIZING, PURIFYING, AND ADSORBENT COMPOSITION.

No Drawing.   Application filed February 27, 1924. Serial No. 695,575.

This invention relates to the art of treating various organic and mineral oils and oleaginous mixtures, and presents a new and useful compound which is characterized by high efficiency when used for its intended purposes. The compound is adapted to a wide variety of purposes as a decolorizing, purifying and absorbent compound for mineral oils and solutions of various organic and inorganic mixtures; purification of substances of this character by elimination of contained impurities such as sulphur; the absorption of gases from mixtures such as the absorption of gasoline from natural gas; and the dehydration of gases and organic liquids. The compound may be reactivated for subsequent use for an indefinite number of times without apparent loss, such loss as occurs being in usual operations a mechanical one.

This compound consists essentially of a mixture of silica and alumina, which mixture may be in various proportions. Hereinafter is given one of the several methods by which the compound may be prepared.

In separate receptacles, a silicate solution and an aluminum salt solution are compounded. The silicate solution may be produced by diluting sodium silicate, $Na_2Si_3O_7$, 40 degrees Bé. with ten parts of water; and the alumina solution may be produced by diluting aluminum sulphate, $Al_2(SO_4)_3$, with twenty parts of water. These solutions are then combined in proper proportions to bring about the following reactions:

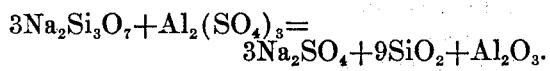

$$3Na_2Si_3O_7 + Al_2(SO_4)_3 = 3Na_2SO_4 + 9SiO_2 + Al_2O_3.$$

An intimate mixture of the component elements results from the simultaneous precipitation of the materials, after which the precipitated mixture is separated from the solution and dried. The dried mixture contains silica, alumina, sodium sulphate and small amounts of impurities. In order to derive the greatest efficiency from the compound, it is essential that a maximum amount of the sodium sulphate and impurities be removed from the silica and alumina compound. This is accomplished by grinding the dried mixture, after which it is thoroughly washed with water which dissolves the soluble salts such as sodium sulphate and other soluble impurities. Sodium sulphate is particularly detrimental to the action of the compound and it is therefore necessary that the washing operation be quite thorough and extensive so that a maximum removal thereof may be accomplished.

After removal of the soluble impurities, the residue is again dried and ground to suitable fineness for the various uses to which it is to be applied. For decolorizing and purifying, a fineness of 200 mesh is desirable; as an absorbent, 40 mesh may be used.

Activation of the ground compound is accomplished by heating to a temperature of 200 degrees centigrade. Care must be taken however to not employ elevated temperatures as such may cause combination of the components of the compound and would thus impair the efficiency thereof.

By the above method of production, a composition of the finished product is attained which has the substantial proportions of 84 parts silica and 16 parts alumina. It is to be understood, however, that several silicates of soda may be used and also a number of alums may be used, but it is preferable to employ sodium silicate $Na_2Si_3O_7$ and aluminum sulphate $Al_2(SO_4)_3$. The other materials which may be used include aluminum chloride, aluminum acetate, etc.

The compound of silica and alumina such as obtained by use of the hereinbefore named method is substantially insoluble and is therefore not subject to loss, such loss as occurs, being chiefly due to the handling and transportation of the compound between the treating vats and the reactivating ovens.

I claim as my invention:

1. A decolorizing, purifying and absorbent mass comprising only alumina substantially free from impurities and silica substantially free from impurities.

2. A decolorizing, purifying and absorbent mass comprising substantially only alumina and silica in powdered form, said alumina and silica being substantially free from alkali.

3. A decolorizing, purifying and absorbent mass comprising substantially only alumina and silica in absorptive activated condition.

4. A decolorizing, purifying and absorbent mass comprising substantially only alumina and silica substantially in the proportion of 16 parts of the former to 84 parts of the latter.

5. A decolorizing, purifying and absorbent mass comprising substantially only alumina and silica in absorptive activated condition, and in substantially the proportion of 16 parts of the former to 84 parts of the latter.

In testimony whereof, I have hereunto set my hand at Martinez, California, this 9 day of February, 1924.

JAMES K. STEWART.